United States Patent [19]

High

[11] 4,106,789
[45] Aug. 15, 1978

[54] MOTOR VEHICLE SUSPENSION SYSTEM

[76] Inventor: Steve High, 3526 Wyoming NE. Apt. 101, Albuquerque, N. Mex. 87111

[21] Appl. No.: 794,976

[22] Filed: May 9, 1977

[51] Int. Cl. ............................................. B60g 11/04
[52] U.S. Cl. .................................... 280/793; 280/695
[58] Field of Search ................ 280/106.5 R, 700, 695

[56] References Cited

U.S. PATENT DOCUMENTS

| 1,209,205 | 12/1916 | Ridgway | 280/106.5 R |
|---|---|---|---|
| 1,664,131 | 3/1928 | Ray | 280/106.5 R |
| 1,886,940 | 11/1932 | Causan | 280/106.5 R |
| 2,740,486 | 4/1956 | Wayman | 280/106.5 R X |
| 3,685,854 | 8/1972 | Cadiou | 280/106.5 R |
| 3,689,054 | 9/1972 | Gouirand | 280/106.5 R |
| 3,992,036 | 11/1976 | Allison | 280/695 |

Primary Examiner—Robert R. Song
Attorney, Agent, or Firm—Kenway & Jenney

[57] ABSTRACT

An independent torsion suspension system for a motor vehicle is disclosed. The suspension system incorporates two curved crossover members which cross each other at at least one point but which are preferably not connected to each other at the crossover points. The suspension can be adapted to vehicles of any size and is preferably connected to provide an independent front suspension.

11 Claims, 8 Drawing Figures

MOTOR VEHICLE SUSPENSION SYSTEM

This invention relates generally to motor vehicle suspension systems and more particular to a torsion suspension system providing independent suspension of each front wheel member.

BACKGROUND OF THE INVENTION

Many different motor vehicle suspensions have been proposed in the past. Some are designed to provide a smooth riding passenger compartment and others are designed primarily for automobile stability and control, for example, for racing vehicles. In either case, industry and private individuals have constantly strived to develop front suspensions which are inexpensive both in terms of material and fabrication costs.

However, most suspension systems in use today require a relatively large number of components, bends, welds, etc., which, because of the relatively high cost of capital equipment and labor, can unduly increase the cost of the suspension system and hence of the vehicle.

It is therefore an object of the present invention to provide an independent suspension system which uses a minimum of material, and which can be fabricated with a minimum of labor. Other objects of the invention are to provide a suspension system which provides superior riding and racing characteristics, which provides smooth handling and control of the vehicle, which is reliable, and which is economical to build both on a mass production assembly line basis as well as in small lots.

SUMMARY OF THE INVENTION

The invention features a suspension system for a motor vehicle comprising first and second crossover supporting members, the first crossover member extending from substantially a rearward section of the vehicle on a first side of the vehicle to a side front section of the vehicle. The second crossover member extends from the rearward section on the second side of the vehicle to an opposing side front section. The crossover members cross each other at least once. First and second wheel connecting means are provided to connect the front wheels to front end portions of the first and second members respectively. The rear wheels are integrally connected to rearward sections of the first and second crossover members. The first and second crossover members are free to move relative to each other in a substantially vertical direction at each crossover point of the members. The first member, at least at a rearward portion of the member, is placed under torsion in response to vertical movement of the front end portion of the member and the second member, at least at a rearward portion of the member, is similarly placed under torsion in response to vertical movement of its front end portion. Means for at least partially restraining longitudinal movement of the front end portions of the crossover members is provided while allowing each front end portion to move, substantially independently and freely, in the vertical direction. A frame member provides support by integrally connecting the rearward sections.

In a preferred embodiment of the invention, the longitudinal restraining means comprises a first longitudinal restraining member connected between a first position on the first crossover member forward of the forwardmost crossover point and a second position on the second crossover member rearward of the forwardmost crossover point. A second restraining member is connected between a third position forward of the forwardmost crossover point on the second crossover member and a fourth position rearward of the forwardmost crossover point on the first crossover member.

The invention further features crossover members wherein each member is a single elongated tubular member having a substantially constant radius of curvature at one end.

DESCRIPTION OF THE DRAWINGS

Other objects, features and advantages of the invention will appear from the following description of particular preferred embodiments of the invention taken together with the drawings in which.

DESCRIPTION OF PARTICULAR PREFERRED EMBODIMENTS

Figure 1:
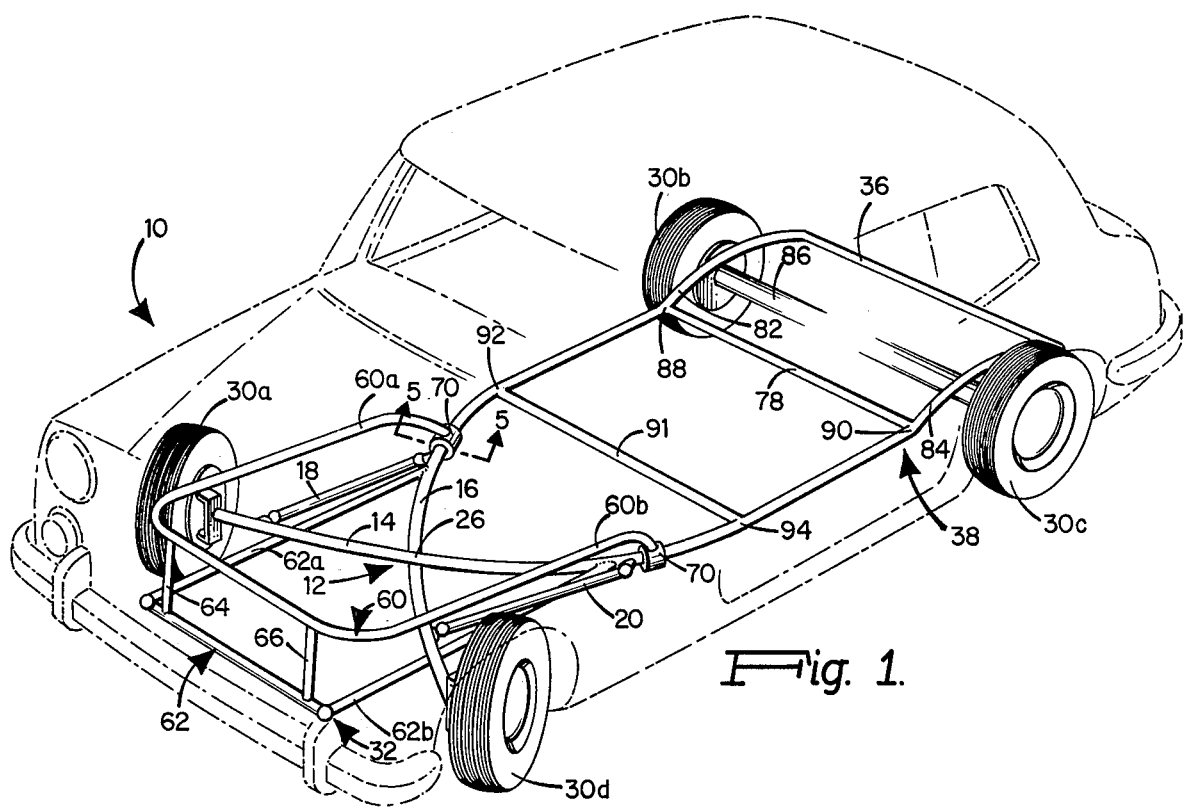
FIG. 1 is a perspective view of a motor vehicle incorporating a suspension system according to one aspect of the invention.
Figure 2:
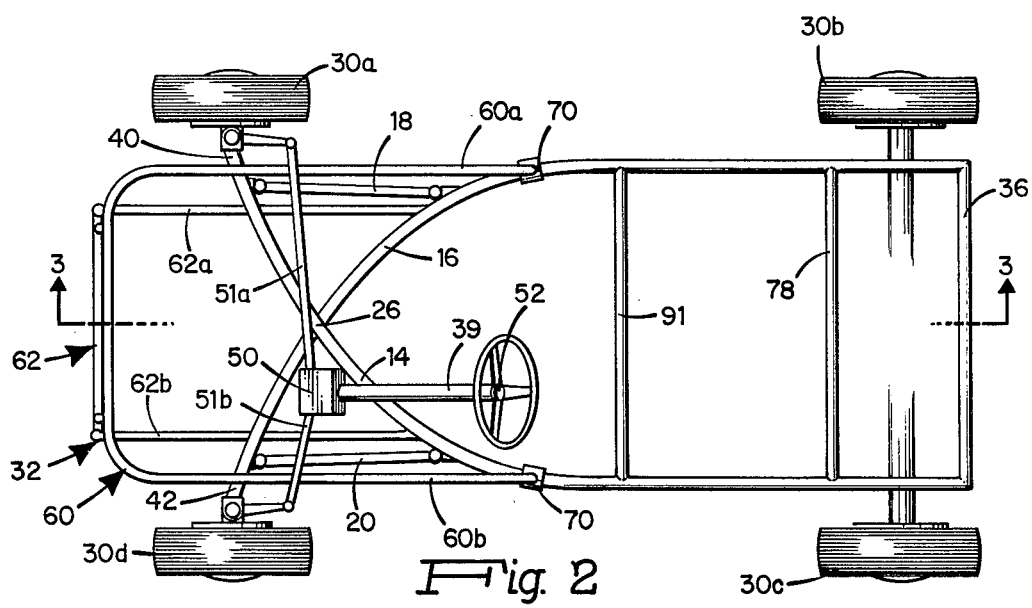
FIG. 2 is a plan view of the motor vehicle showing the suspension system according to one aspect of the invention.

Referring to FIG. 1, a motor vehicle 10, which may be for example an automobile for passenger use, a racing car such as those in the sprint class or a go cart such as those used and designed for racing, is provided with a fundamentally different and new independent front suspension 12. The suspension includes a pair of curved crossover members 14, 16, which in one aspect, are each respectively connected at a rearward section on opposite sides of the vehicle and extend to a front section on the opposing side of the vehicle, and longitudinal restraining members, in this embodiment, radius rods 18 and 20. Longitudinal restraining members 18 and 20 are connected between a front portion on one crossover member and a rearward portion on the other crossover member. At the point or location 26 at which the members 14, 16 cross, there is no connection between the two members and the members are separate and spaced apart from each other. Thus, crossover members 14 and 16 may move vertically with respect to each other at the crossover point.

Motor vehicle 10 also includes wheels 30a, 30b, 30c, 30d, a front bumper system 32 connected to crossover members 14, 16, a rear bumper support member 36, a rearward positioned frame 38, a steering system 39, and braking and engine systems (not shown).

Figure 3:
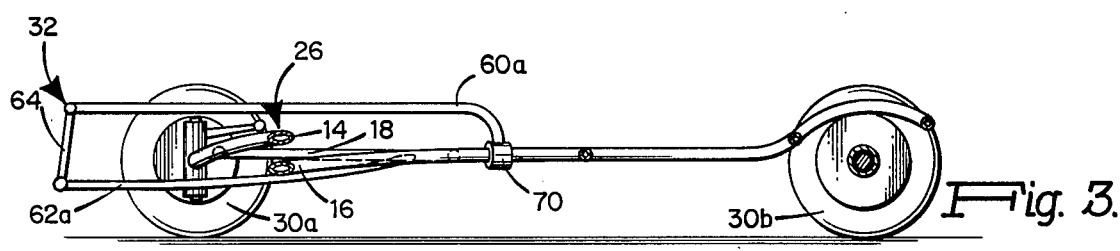
FIG. 3 is a section along lines 3—3 of FIG. 2.
Figure 4:
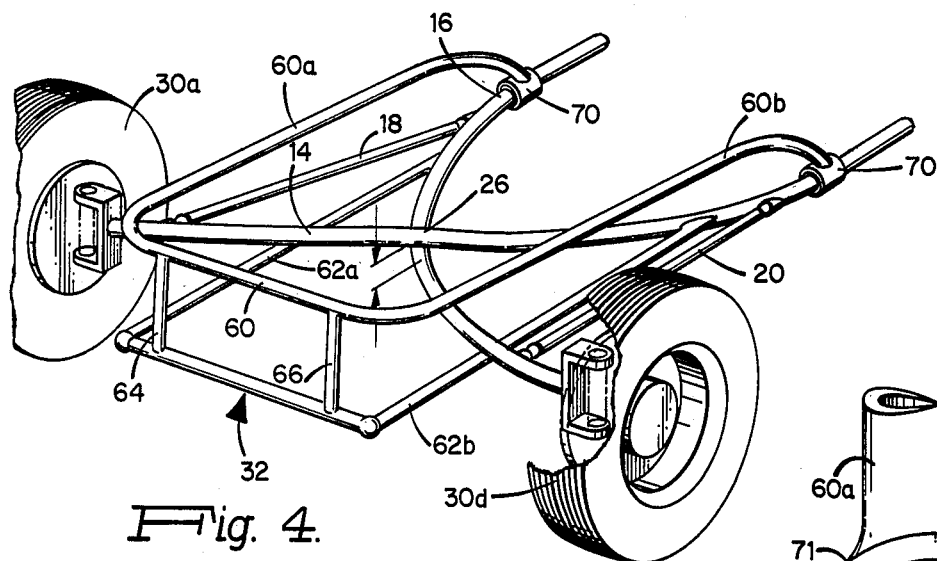
FIG. 4 is a perspective view of the front end system, radius rods, and crossover points according to one aspect of the invention.

Referring to FIGS. 2, 3, 4, and 5, crossover members 14, 16 are of sufficiently heavy gauge material preferably having a hollow, circular cross section, to support the weight of vehicle 10 and to withstand the forces to which the suspension system is subjected during operation of the vehicle. The crossover members, as shown in FIG. 3, do not connect at the crossover point 26 and are normally separated at that point by a distance, preferably somewhat greater than the expected movement due to deflection of the front end portions 40, 42 respectively, for example during turns or resulting from deflection of a wheel as it passes over a bump or into a depression in the roadway surface.

The suspension operates on a torsion principle. When there is a vertical deflection of a front end portion of a crossover member, there results a torsion on the remainder of the crossover member primarily rearward of the crossover point. The torsion on the member is not however abrupt and increases gradually along the crossover member. The torsion reaction of the crossover member provides a spring action tending to balance the vehicle and to dampen the deflection and subsequent oscillations; and, when the deflection is caused by the motion of the vehicle while cornering, the disclosed suspension system advantageously transfers the weight of the vehicle somewhat to the inner wheels to provide better stability and control of the vehicle.

The suspension must allow for vertical movement of the front end portions of the crossover members to which the front wheels are attached; however, longitudinal or lateral movement at those front end portions may produce significant instabilities in the vehicle and are potentially unsafe. Longitudinal restraining members 18, 20 are thereby provided to restrain movement of the front portion of the crossover members at least in a longitudinal direction. This provides a needed stability for the vehicle during normal driving or racing conditions.

The longitudinal restraining members 18, 20, which are preferably radius rods, are connected to and between members 14, 16 with ball end joints so that vertical movement of the front end portions is not restrained. Member 18 is connected between a position forward of the crossover point on member 14 to a position rearward of the crossover point on member 16. Restraining member 20 is similarly connected between members 14 and 16 on the other side of the vehicle.

With the front end portions of the crossover members thus stabilized, the steering mechanism, comprising a steering box 50 connected by the usual tie rod arrangement 51a, 51b to front wheels 30a and 30d and controlled by a steering wheel and column arrangement 52 adequately and safely controls and guides the directional movement of the vehicle.

In a particularly preferred embodiment, the front bumper is connected to the crossover members to further stabilize them against lateral movement and to provide a frame for the forward part of the vehicle. The bumper comprises an upper rail 60, having longitudinally extending sides 60a and 60b and a lower rail 62 having longitudinally extending side sections 62a and 62b. Rails 60 and 62 are rigidly connected to each other at a front end of the vehicle by vertical support members 64, 66. The upper rail sections 60a and 60b are connected to crossover members 14, 16 using rubber bushed clamps 70. These clamps allow a torsion of the bumper upper rail with respect to the crossover members. The lower rail sections 62a and 62b are preferably rigidly connected to the crossover members for example by welding.

Figure 5:
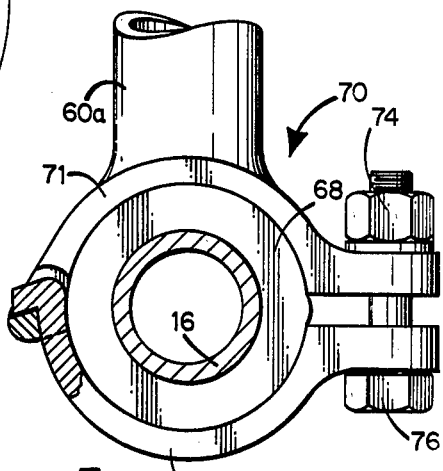
FIG. 5 is a cross-sectional view along lines 5—5 of FIG. 1.

The rubber bushed clamps connecting upper rail members 60a and 60b to crossover members 14, 16 are shown in cross section in FIG. 5. A typical clamp comprises a rubber gasketing member 68 compressed by a clamp having a first clamp portion 71 which is adapted to mate cooperatively with a second clamp portion 72. The clamp is held in place by a nut 74 and bolt 76 arrangement.

The rearward frame structure 38 comprises cross member 78, bumper support 36, and side members 82, 84 all integrally connected to form a strong rigid structure. A rear axle 86 is supported by frame structure 38 by means not shown. In this preferred embodiment, crossover members 14, 16 are secured to the frame structure 38, preferably by welding at 88, 90. In order to provide the necessary spacing at the crossover point, the crossover members are welded so that the plane of one member makes a small positive angle to a horizontal plane, and the plane of the second member makes a small negative angle with the horizontal plane. Further, a cross member 91 is rigidly connected to the crossover members, laterally of the car, at 92, 94, preferably by welding. Cross member 91 is positioned at about the midpoint of the car.

Having described the basic frame structure of the motor vehicle, seats, an engine, and the like may be mounted therein. Also, more conventional motion controlling devices, such as shock absorbers and coil springs may be added to provide further control and stability for the vehicle.

Figure 6:
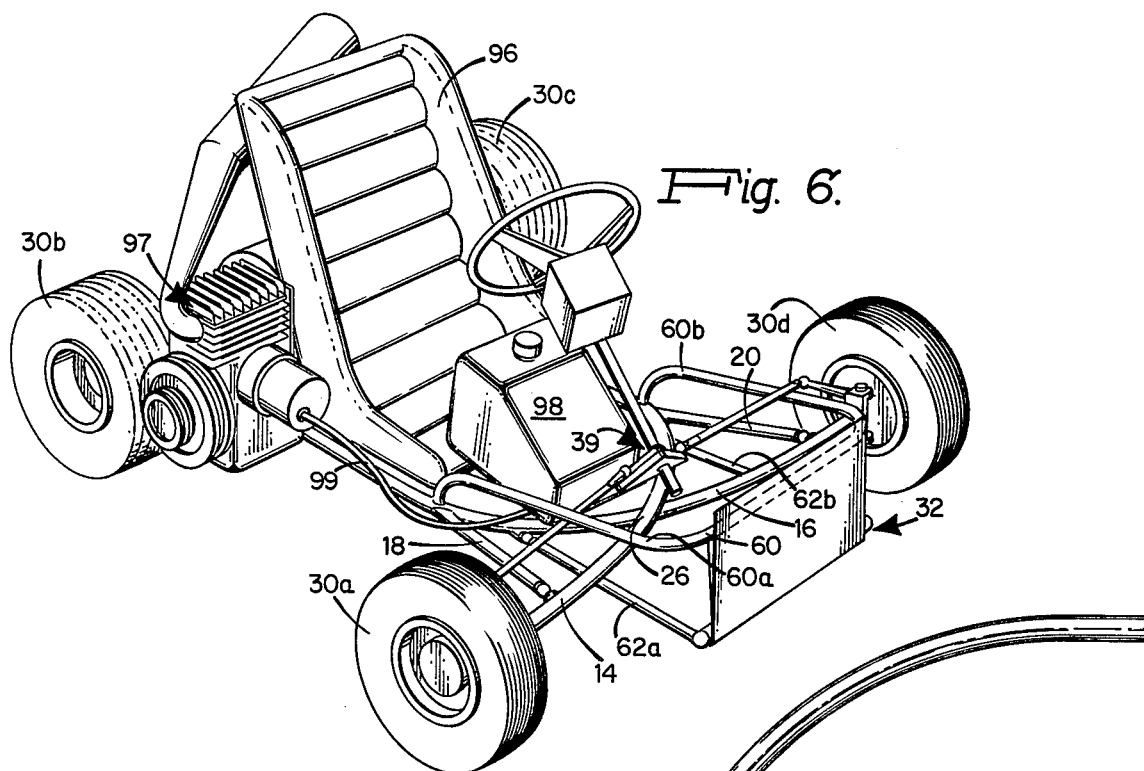
FIG. 6 is a perspective view of a go cart incorporating a suspension system according to the invention.

The crossover independent suspension of the invention is particularly suited for use in a go cart. A typical configuration for the crossover member is shown in FIG. 6. The suspension system for the go cart is identical to the suspension described in connection with the vehicle shown in FIG. 1. In either case, the crossover member may be fabricated from a chromium molybdenum alloy steel with a high carbon content. A preferred steel is designated as Type 4130 (seamless) or chrome moly steel. This material is chosen because it is not too hard to be bent easily, but is also not too soft that it will lose the springiness which is necessary to provide an adequate independent suspension for the vehicle.

Figure 7:
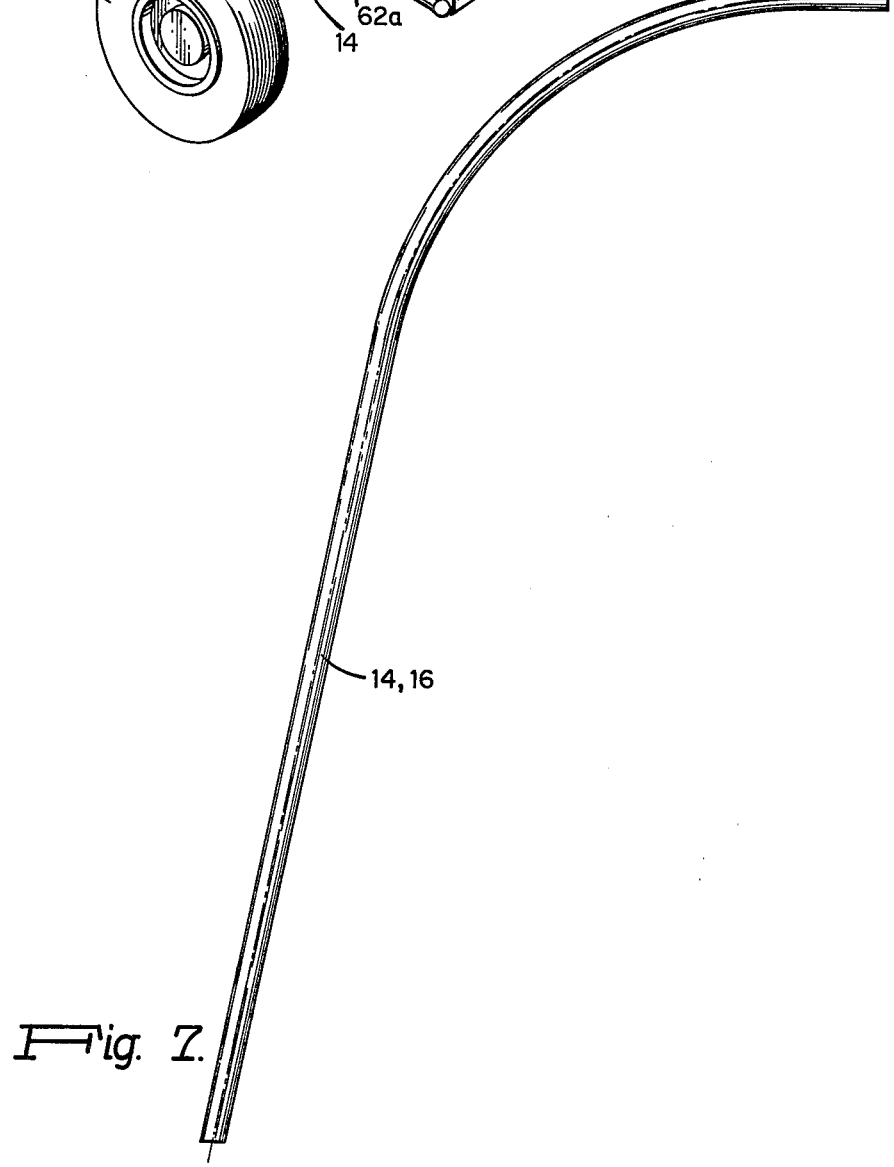
FIG. 7 is a dimensioned drawing of a crossover member for the embodiment of FIG. 6.

Referring to FIG. 6, and using like reference numbers to identify like parts, a typical go cart has a wheel base of about 50 inches and a width between front wheels of about 28 inches. The dimensioned drawing (FIG. 7) shows a crossover member 14 or 16 for the go cart of FIG. 6 and relates the dimensions to the center line of the cart. For the go cart, a 1 inch O.D. conduit having a 0.095 inch wall thickness was used. The cart is provided with an engine system 97 mounted near and connected to drive rear wheels 30b and 30c. Engine 97 is supplied with fuel from a fuel container 98 over a fuel line 99. A seat 96 is provided for the driver.

Figure 8:
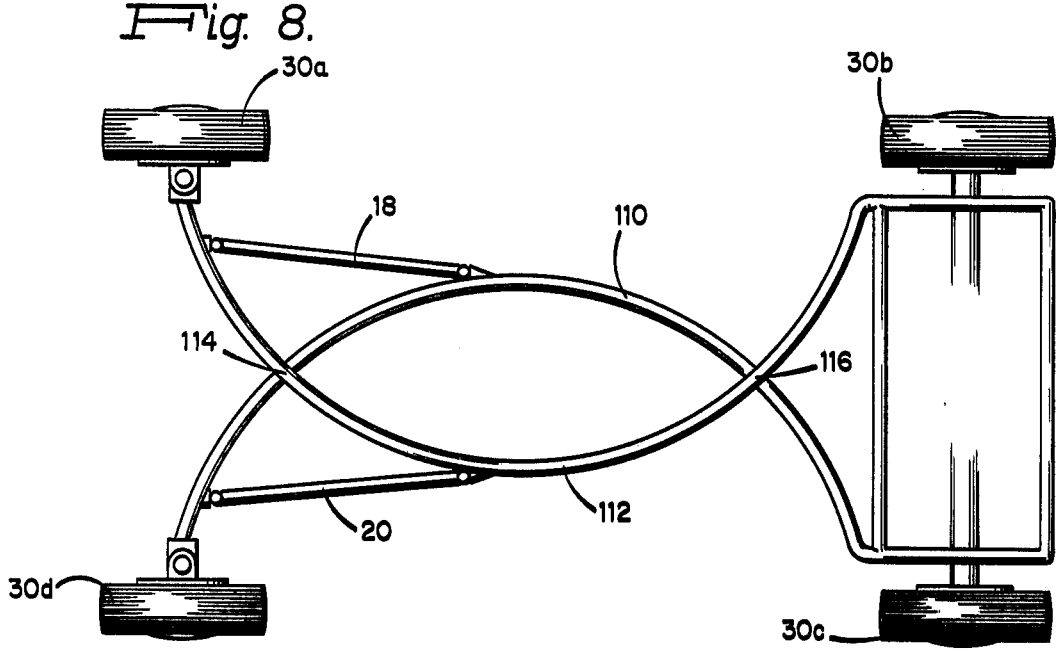
FIG. 8 is a schematic representation of an embodiment of the invention having two crossover points.

Referring to FIG. 8, in another aspect of the invention, crossover members 110, 112 have two crossover points 114, 116. While the crossover members in this embodiment will not transfer as much weight to the outside during cornering, it does provide the opportunity, if desired, to independently spring the rear wheels as well as the front wheels, by appropriately connecting the crossover members near the middle of the vehicle rather than rearward as shown.

ADVANTAGES OF THE INVENTION

The invention advantageously provides a novel suspension system having a minimum of components and requiring minimum labor to construct. The suspension system is adaptable to both large and small vehicles and may be advantageously produced in large or small lots.

The invention described and claimed in the application provides independent front suspension using a torsion principle which distributes the torsion load along the length of the crossover members. The crossover members are advantageously designed to provide control against roll over and advantageously shift the weight of the vehicle in cornering somewhat to the inside of the vehicle. This provides a superior riding vehicle when compared to other suspensions of the same simplicity.

The suspension is particularly advantageous in connection with go cart racing wherein an individual operator and driver may construct the vehicle incorporating the suspension and be thereby provided with superior ability to safely control and manipulate his vehicle.

Other embodiments of the invention will be obvious to those skilled in the art. Other configurations of crossover members, whereby a torsion is developed due to independent vertical movement of a front wheel, will be obvious to those skilled in the art and are within the following claims. What is claimed is:

1. A suspension system for a motor vehicle comprising
   first and second crossover supporting members, said first crossover member extending from substantially a rearward section on a first side of the vehicle to a side front section of the vehicle, and said second crossover member extending from said rearward section on the second side of the vehicle to an opposing side front section of the vehicle, said first and second crossover members crossing each other at least once,
   first and second means for connecting a front wheel to a front end portion of each of said first and second members respectively,
   means for integrally connecting rear wheels to rearward portions of said first and second crossover members,
   said first and second members being free to move relative to one another in a substantially vertical direction at each crossover point of said members,
   said first member, at least at a rearward portion, being placed under torsion in response to vertical movement of the front end portion of the member,
   said second member, at least at a rearward portion, being placed under torsion in response to vertical movement of the front end portion of the member,
   means for restraining longitudinal movement of the front end portions of said crossover members while allowing said respective front end portions to move substantially freely and independently, in the vertical direction, and
   frame means integrally connecting said rearward portions.

2. The suspension system of claim 1 wherein said restraining means further restrains lateral movement of the respective front end portions of said crossover members.

3. The suspension system of claim 1 wherein said restraining means comprises
   first and second longitudinal restraining members, said first restraining member being connected between a first position on said first crossover member forward of a forwardmost crossover point and a second position on said second crossover member rearward of said forwardmost crossover point, and said second restraining member being connected between a third position forward of said forwardmost crossover point on said second crossover member and a fourth position rearward of said forwardmost crossover point on said first crossover member, said forwardmost connections substantially unaffecting vertical motion of said respective front portions.

4. The suspension system of claim 3 wherein there is one crossover point.

5. The suspension system of claim 3 wherein there are two crossover points.

6. The suspension system of claim 1 wherein each crossover member comprises a forward portion having a substantially constant radius of curvature.

7. The suspension system of claim 1 further comprising a front bumper frame assembly connected to said crossover members rearward of a forwardmost crossover point to provide added lateral and longitudinal stability to said suspension while allowing the crossover members to twist with respect to connecting portions of the bumper frame.

8. The suspension system of claim 1 including a rigid frame structure positioned rearward of said forwardmost crossover point and rigidly connected to said crossover members rearward of said forwardmost crossover.

9. The suspension system of claim 1 wherein each crossover member is a single length of circular cross section tubing.

10. The suspension system of claim 1 wherein said first and second crossover members lie in first and second planes, said planes being at a small angle to each other.

11. A suspension system for stabilizing the motion of a go cart comprising first and second curved crossover supporting members, the first crossover member extending from substantially a rearward section on a first side of the vehicle to a front section on a second side of the vehicle and said second crossover member extending from a rearward section on the second side of the vehicle to a front section on the first side of the vehicle, said first and second crossover members crossing each other once,
   first and second means for connecting a front wheel to a front end portion of each of said first and second members respectively,
   frame means for integrally connecting the rear wheels to a rearward section of the first and second crossover members,
   the first and second crossover members being free to move relative to one another in substantially a vertical direction at the crossover point of the members and the members not being in contact with each other at the crossover point,
   the first member, at least at a rearward portion, being placed under torsion in response to vertical movement of the front end portion of the member,
   said second member, at least at a rearward portion, being placed under torsion in response to vertical movement of a front end portion of the member, and
   first and second longitudinal movement restraining members, the first restraining member being connected between a first position on the first crossover member forward of the crossover point and a second position on the second crossover member rearward of the crossover point, and the second longitudinal restraining member being connected between a third position forward of the crossover point on the second crossover member and a fourth position on the first crossover member rearward of the crossover point, said connections substantially unaffecting vertical motion of the respective front end portions.

* * * * *